No. 885,016. PATENTED APR. 21, 1908.
V. Z. CARACRISTI & G. W. TROXLER.
SCREW THREADING MACHINE.
APPLICATION FILED APR. 19, 1907.
3 SHEETS—SHEET 2.
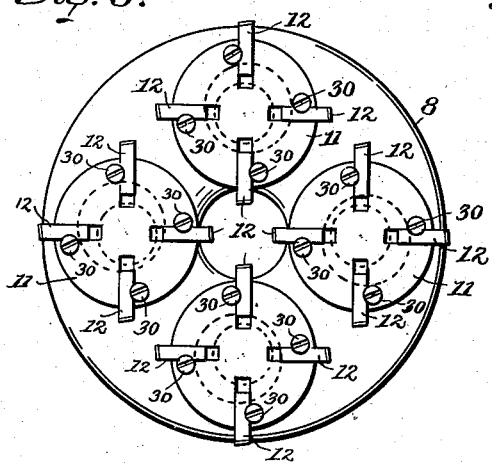
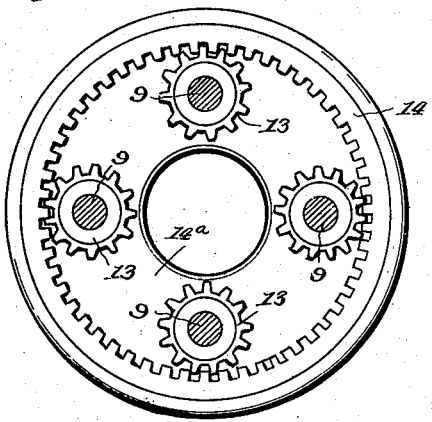
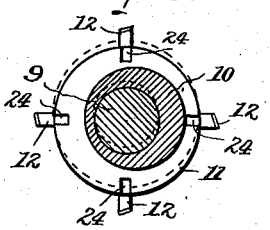
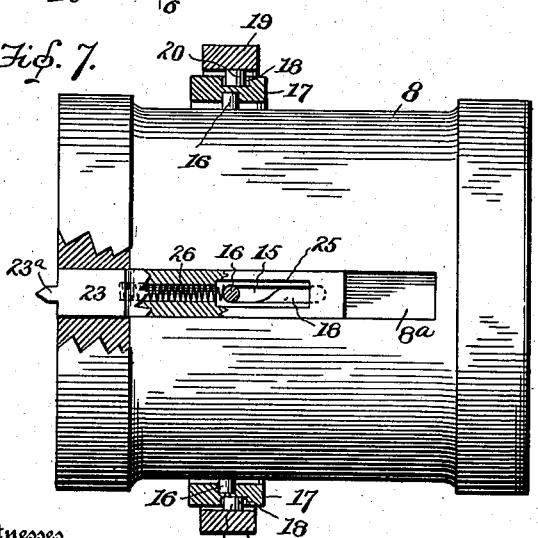
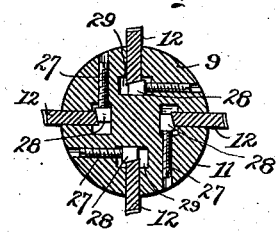
Witnesses
Inventors:
Geo. W. Troxler &
V. Z. Caracristi,
By
Attorney.

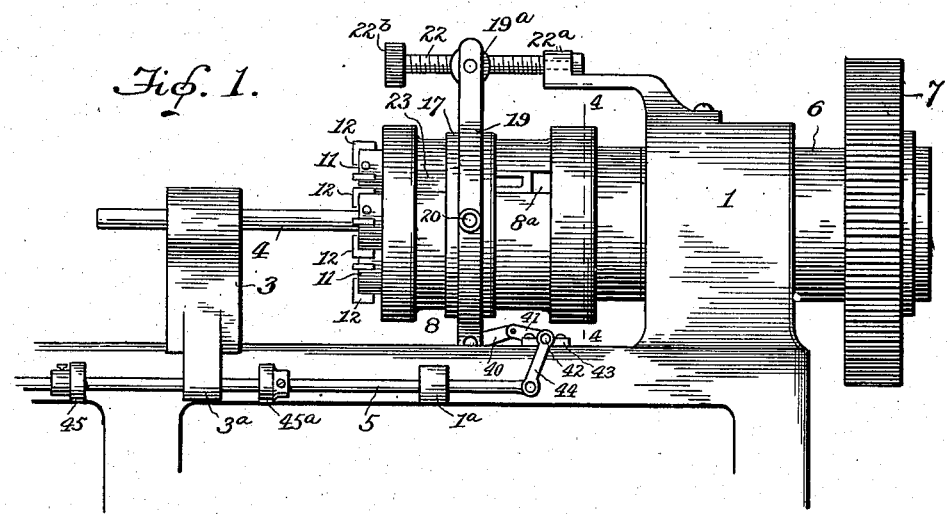

No. 885,016. PATENTED APR. 21, 1908.
V. Z. CARACRISTI & G. W. TROXLER.
SCREW THREADING MACHINE.
APPLICATION FILED APR. 19, 1907.

3 SHEETS—SHEET 3.

Witnesses
Inventors:
Geo. W. Troxler &
By V. Z. Caracristi,
Attorney.

UNITED STATES PATENT OFFICE.

VIRGINIUS Z. CARACRISTI, OF GRANITE, AND GEORGE W. TROXLER, OF RICHMOND, VIRGINIA.

SCREW-THREADING MACHINE.

No. 885,016.

Specification of Letters Patent.

Patented April 21, 1908.

Application filed April 19, 1907. Serial No. 369,144.

*To all whom it may concern:*

Be it known that we, VIRGINIUS Z. CARACRISTI and GEORGE W. TROXLER, citizens of the United States, the former residing at Granite, in the county of Chesterfield, State of Virginia, and the latter residing at Richmond, in the county of Henrico, State of Virginia, have invented a Screw-Threading Machine, of which the following is a specification.

The principal objects of our invention are to provide certain mechanism for automatically opening the dies of a screw threading machine to release the rod, bolt or pipe after the thread is cut thereon; to provide for readily and conveniently bringing different cutting dies into operative position so as to adapt the machine to cut threads of different sizes and pitch; and to improve the general construction of the machine so as to facilitate the operation of threading rods, bolts, pipes, etc.

In the following specifications we have entered into a description of the construction, operation and practical advantages of our invention, and what we claim as new is more specifically set forth in the appended claims.

Figure 9:
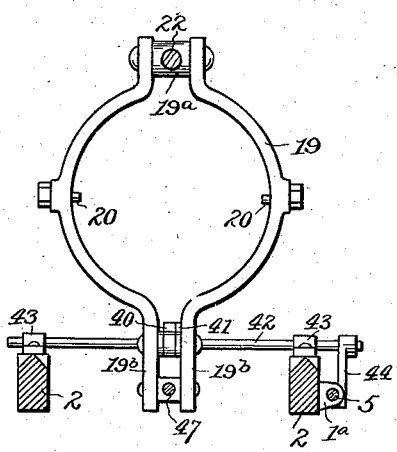
Figure 10:
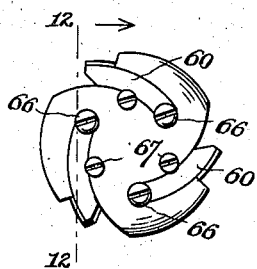
Figure 11:
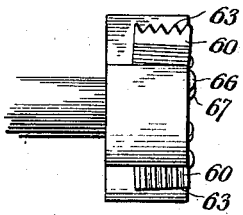
Figure 12:
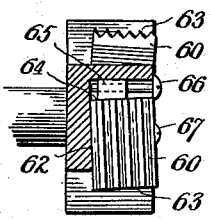

In the accompanying drawings, which form a part of this specification: Figure 1 is a side view of a screw threading machine embodying our invention. Fig. 2 is a longitudinal sectional view through the die-head and driving-spindle upon which it is mounted. Fig. 3 is a front elevation of the cutter-head. Fig. 4 is an enlarged sectional view, taken on the line 4—4 of Fig. 1, and showing the gearing mechanism for changing the cutting dies. Fig. 5 is a detail view of one of the die-holders. Fig. 6 is a sectional view through the die-holder, on the line 6—6 of Fig. 5. Fig. 7 is a view illustrating the mechanism employed for operating the die-holders. Fig. 8 is a detail sectional view through the head of one of the die-holders, to show the means for adjusting the cutting dies. Fig. 9 is a detail view showing the means for operating the yoke. Fig. 10 is a view showing a modification of the cutting dies. Fig. 11 is a side view of the modification. Fig. 12 is a sectional view on the line 12—12 of Fig. 10.

In carrying out our invention we employ any approved type of supporting frame, to provide a bearing box 1 and horizontal tracks 2, upon which latter moves the usual carriage 3 for feeding the stock to the die-head, and in which carriage such stock, as the rod 4, is suitably held. The carriage is provided with an arm 3ª, adapted to operate a push-bar 5, which actuates the tripping mechanism, hereinafter described.

Mounted in the bearing box 1 of the supporting-frame is a hollow spindle 6, to the rear end of which is keyed a driving spur-gear 7, and said spindle is reduced and threaded, as at 6ª, and beyond said threaded portion is further reduced, as at 6ᵇ, to receive the operating parts of the die-head.

8 designates the die-head, which is provided with a suitable number of active cutting-dies, in the present instance four, the cutting edges of which are arranged concentric around the axis of the die-head so as to follow each other in cutting the thread upon the rod, bolt or pipe. For the purpose of moving these cutting dies in and out of operative position with respect to the rod or bolt, and thereby provide for releasing the latter after it has been threaded, said cutting dies are each carried at the outer end of a rod or spindle 9, which projects from a rock-shaft 10 at one side of the center or axis thereof (see Fig. 6) so that when said shaft is turned the rod or spindle, and cutters carried thereby, will be moved radially with respect to the die-head and therefore open and close.

The rod or spindle 9 extends longitudinally through the shaft or cylinder 10, and is rotatable therein, and at its outer end is formed with a cylindrical head 11, to receive a number of cutting dies or chasers 12 which project beyond the periphery of said head and are adapted to be brought into operative position with respect to the die-head by turning said spindle, as hereinafter explained. Instead of the thread-cutting dies shown in the drawings we also purpose using the ordinary skinning dies for forming what is known as a box tool. The rear end of each spindle 9 is extended beyond the shaft or cylinder 10 and has attached thereto a spur-pinion 13, which meshes with an internally-toothed gear-ring 14 secured to a flanged disk 14ª which is threaded on the portion 6ª of the driving-spindle. The teeth of the pinions 13 and gear-ring 14 are of such length as to permit of the required movement of the spindles of the die-holders without disengaging said teeth; for, as will be hereinafter explained, said gears not only provide for turning the spindles 9 to bring different cutting-dies or chasers into operative position, but also connect the die-head to the driving-spindle so that it will turn therewith.

Each shaft or cylinder 10 of the die-holders is provided with a cam-slot 15 in which engages a pin 16 carried by a ring 17 encircling the die-head and shiftable laterally thereon, said ring being thereby adapted to operate the several die-holders simultaneously. Each pin 16 passes through a straight guide-slot 18 (Fig. 7) in the die-head, so that when the ring is shifted back and forth the pins will travel in a straight line longitudinally of the die-head and engaging the walls of the cam-slots 15 will turn or rock the shafts 10. The ring 17 is shifted by means of a two-part yoke 19, which passes around said ring and at opposite sides of the die-head is provided with pins or trunnions 20 engaging in a groove 21 in the periphery of the ring. Between the upper ends of the parts of the yoke is a block 19$^a$ by which said yoke is pivotally supported on a threaded rod 22 projecting from and rotatable in the outer end of a bracket-arm 22$^a$. The threaded rod is provided with a milled head 22$^b$ by which it is turned, and the purpose of this rod is to provide for changing the location of the pivot-point of the yoke so that the range of movement of the operating-ring 17 may be varied. Between the lower ends of the parts of the yoke is pivoted a link 40 connected to a link 41 fixed to a shaft 42, the latter extending transversely across the supporting frame and is journaled in bearings 43 thereon. The shaft 42 has fixed on one of the outer ends thereof an arm 44, by which it is connected to the push-bar 5, said push-bar being slidably mounted in bearings 1$^a$ at the sides of the supporting frame. On the push-bar are secured collars or buttons 45 and 45$^a$ against which the arm 3$^a$ of the carriage strikes to actuate said bar automatically as the carriage is moved backward and forward. For the purpose of operating the yoke to quickly open the dies when the push-bar is moved rearward only a slight distance we employ a spring 46 mounted on a rod 47 connected to the lower end 19$^b$ of the yoke and interposed between a collar 48 on said rod and a stationary cross-bar on the frame. It will be seen, therefore, that when the carriage operates the push-bar sufficiently to bring the connected links 40 and 41 below the plane of the opposite ends of said links the spring 46 will act to throw the yoke rearward, and the latter operating the ring 17 the pins 16 will be moved in the slots and turn the shafts or cylinders 10 and open the dies. In this operation the arm on the carriage engages the button 45$^a$. When the carriage is moved backward the arm striking the button 45 will move the rod 5 and the latter by its connecting arm 44 will turn the shaft 42 so that the links will throw the yoke forward, and in this operation the links will be swung upward to the position shown in Figs. 1 and 2 and serve to lock the yoke in this position, being held from further upward movement by means of the stop 50.

For the purpose of locking the pinions 13 in engagement with the teeth of the gear-ring 14, as well as to hold the working or active cutting dies in operative position each head 11 of the die-holders is engaged by a spring-actuated sliding catch 23, said catches being mounted in suitable recesses 8$^a$ therefor in the die-head, and are adapted to engage notches or recesses 24 in the aforesaid heads 11. The sliding catches are mounted above the slots 18 through which the operating pins 16 pass, and are also slotted for the passage of said pins. These slots, 25, are of such length as to permit of the movement of the pins sufficient to operate the die-holders and without operating the slide or catch, but, as will be seen by reference to Fig. 7, an excessive rearward movement of the pins 16 will engage the rear wall of the slot 25 and move the slides or catches so that they will disengage the heads 11 of the die-holders. This movement is effected by turning the screw-rod 22 after the lower end of the lever is thrown rearward by operating the shaft 42 and the connecting-links. When the sliding catches are moved to disengage the heads of the die-holders the spur-pinions 13 will be free to turn, and by turning the gear-ring the spindles 9 of said die-holders will be turned through the intervention of said pinions so that another set of cutting-dies will be brought to operative position. In order that the sliding catches will maintain their engagement with the die-holders during the operation of merely opening and closing the dies, helical springs 26 are employed which bear at one end against the pins 16 and at the other end against said catch, being located for support in longitudinal recesses in the latter. The ends 23$^a$ of the sliding catches are reduced and beveled so as to engage the recesses 24 in the die-holders and properly position the cutting edges of the dies with respect to the die-head.

The die-holders each carry a number of cutting-dies or chasers, in the present instance four, as in Fig. 8, and these are located in recesses in the cylindrical heads of the die-holders and are adjusted by means of a screw 27 having a head 28 at its inner end with a beveled face which rides upon the correspondingly beveled inner end of the cutting-die or chaser; the said die-holder being recessed, as at 29, to permit of the required movement of the head of the screw. It will be obvious, therefore, that by turning the screw 27 in one direction the cutting-die will be moved outward and when said screw is turned in the other direction the cutting die may be pushed inward, and when properly adjusted it is securely held by means of a set-screw 30, (see Figs. 3 and 8).

Instead of employing the straight cutting-dies or chasers, as shown in Figs. 3 and 8, we also purpose using a peculiar form of cutting-die, as illustrated in Figs. 10, 11 and 12. In this instance the cutting die 60, is curved longitudinally, is rectangular in shape, and has the cutting teeth cut parallel with the longitudinal edges thereof. For the purpose of setting these dies so that the cutting edge of each will be disposed at an inclination the recess in the head 61 is inclined at its inner or rear end, as at 62; and this disposition of the cutting die not only presents an inclined cutting edge, as 63, but also a similarly inclined rear edge, as at 64, upon which latter rides the block 65, by which the said cutting-die is adjusted. In this case the screw 66 is threaded through the block, and the head of the screw bears against the face of the die-holder head 61. Also, as in the former case, a set-screw 67 is employed for securing the cutting-die after it is properly adjusted. It will be understood that in this form of die-holder one side of the curved recess which receives the cutting-die is grooved so as to receive the cutting teeth.

From the foregoing description, in connection with the accompanying drawings, the construction and operation of our improved screw threading machine will be readily understood; for the yoke 19 being moved forward the cutting dies will be in operative position to cut a thread on the rod, bolt or pipe, and the length of the thread determined by the adjustment of the button 45ᵃ on the push-rod 5. As the thread is being cut the arm 3ᵃ of the carriage approaches said button, and striking the same will move the rod and the latter being connected to the transverse shaft 42 by the arm 44 will rock or turn said shaft in the direction to swing the links 40 and 41 downward so that the spring 46 may act to throw the yoke, which latter will then operate the die-holders through the ring 17 so as to open the dies and release the threaded rod, bolt or pipe. The carriage is then moved backward or away from the die-head and striking the button 45 will operate the rod 5 so that the yoke is thrown forward to move the dies into operative position for cutting another thread.

Now when it is desired to bring another set of cutting dies into operative position it is only necessary to operate the tripping mechanism so that the yoke will be thrown backward by the spring, and then turn the milled wheel 22ᵇ so that the threaded rod will impart a further rearward movement to the yoke, or sufficient to operate the catches 23. The die-holders being thus disengaged the gear-ring 14 is turned in either direction to bring the next set of cutting-dies into position; after which the threaded rod is turned to restore the normal location of the pivot-point of the yoke.

Having thus described our invention, what we claim as new, and desire to secure by Letters-Patent, is:—

1. In a screw threading machine, the combination with the die-head, of a rock-shaft journaled therein at one side of the work opening, a head rotatably mounted on the forward end of the rock-shaft with its axis at one side of the axis of said rock-shaft, said rotatable head carrying a plurality of cutting-dies, means engaging the rotatable head to locate any one of the cutting-dies in operative position with respect to the work opening of the die-head, and means for rocking the shaft, whereby the cutting-die is movable radially in the die-head.

2. In a screw threading machine, the combination with the die-head, of a rock-shaft journaled therein and having a cam-slot, a rotatable spindle projecting from the forward end of the rock-shaft with its axis at one side of the axis of said rock-shaft, a cutting die attached to the outer end of the spindle and movable radially with respect to the die-head, and a stop on the die-head engaging the cutting die to prevent rotation of the latter while it is moved radially; together with a ring encircling the die-head and having a pin operatively engaging the cam-slot, and means for shifting the ring.

3. In a screw-threading machine, the combination with the die-head, of a rock-shaft journaled therein at one side of the work-opening, a spindle projecting from the forward end of the rock-shaft at one side of the axis thereof, a head on said spindle carrying a plurality of cutting dies, and means for adjusting the spindle to bring any one of the cutting dies into operative position with respect to the work opening of the die-head; together with means for rocking the shaft, whereby the cutting die is movable radially in the die-head.

4. In a screw-threading machine, the combination with the driving spindle, of a gear-ring secured thereto, a die-head loosely mounted on the spindle, rock-shafts journaled in the die-head, spindles extending longitudinally through the rock-shafts, each spindle being located at one side of the axis of its shaft and carrying a plurality of cutting dies at its forward end, pinions on the rear ends of said spindles and in mesh with the aforesaid gear-ring, means for securing the spindles to the die-head, and means for turning the rock-shafts, substantially as shown and described.

5. In a screw-threading machine, the combination with the driving spindle, of a gear-ring secured thereto, a die-head loosely mounted on the spindle, rock-shafts journaled in the die-head, spindles extending longitudinally through the rock-shafts, each spindle being located at one side of the axis of its shaft and carrying a plurality of cutting dies at its forward end and having recesses with relation to the cutting dies, pinions on the rear ends of the spindles and in mesh with the gear-ring, catches on the die-head adapted to engage any one of the recesses in its companion spindle, and means for operating the rock-shafts and catches.

6. In a screw-threading machine, the combination with the driving-spindle, of a gear-ring secured thereto, a die-head loosely mounted on the spindle, rock-shafts journaled in the die-head and having cam-slots, spindles extending longitudinally through the rock-shafts, each spindle being located at one side of the axis of its shaft and carrying a plurality of cutting-dies at its forward end and having recesses with relation to the cutting-dies, pinions at the rear ends of the spindles in mesh with the gear-ring, and sliding catches on the die-head adapted to engage the recesses and lock the spindles; together with a shiftable ring mounted on the die head and having pins which engage the cam-slots and catches, substantially as shown and described.

7. In a screw-threading machine, the combination with the driving-spindle, of a gear-ring secured thereto, a die-head loosely mounted on the spindle, rock-shafts journaled in the die-head and having cam-slots, spindles extending longitudinally through the rock-shafts, each spindle being located at one side of the axis of its shaft and carrying a plurality of cutting dies at its forward end and having recesses with relation to the cutting-dies, pinions at the rear ends of the spindles in mesh with the gear-ring, and spring-actuated catches located in the die-head and adapted to engage the recesses of the die-holders, said catches having slots alining with the aforesaid cam-slots; together with a shiftable ring mounted on the die-head and having pins engaging in the slots in the rock-shafts and catches, substantially as shown and described.

8. In a screw-threading machine, the combination with the driving-spindle, of a gear-ring secured thereto, a die-head loosely mounted on the spindle and having straight slots in the sides thereof, rock-shafts journaled in the die-head and having cam-slots adapted to aline with the slots in said die-head, spindles extending longitudinally through the rock-shafts, each spindle being located at one side of the longitudinal center of the rock-shaft and carrying a plurality of cutting-dies at its forward end and having recesses with relation to the cutting-dies, pinions at the rear ends of the spindles in mesh with the gear-ring, and sliding catches on the die-head adapted to engage the recesses in the spindles and having slots alining with the slots in the die-head; together with a shiftable ring mounted on the die-head and having pins engaging in the slots in the catches, die-head and rock-shafts, substantially as shown and described.

9. In a screw-threading machine, the combination with the driving-spindle, of a gear-ring secured thereto, a die-head loosely mounted on the spindle and having straight slots in the sides thereof, rock-shafts journaled in the die-head and each carrying a plurality of cutting-dies at its forward end and a pinion at its rear end, the latter meshing with the gear-ring, said rock-shafts having cam-slots alining with the slots in the die-head, means on the die-head for engaging the cutting-dies, and a ring encircling the die-head and having pins engaging the aforesaid slots, and means for shifting said ring.

10. In a screw-threading machine, a die-holder having a curved recess therein with an inclined rear wall, a rectangular cutting die curved to fit said recess and engaging the inclined wall thereof, and means for adjusting said die longitudinally and securing it in the die-holder.

In testimony whereof we have signed our names to this specification in the presence of two subscribing witnesses.

VIRGINIUS Z. CARACRISTI.
GEORGE W. TROXLER.

Witnesses:
W. M. MYERS,
E. W. MARABLE.